Jan. 12, 1926.  1,569,198
J. MIKE
VARIABLE POWER TRANSMISSION MEANS FOR COMBINATION AIR WITHDRAWING
AND DELIVERY APPARATUS
Filed April 12, 1924

Inventor
Jan Mike
By
Attorney

Patented Jan. 12, 1926.

1,569,198

UNITED STATES PATENT OFFICE.

JAN MIKE, OF DAWSON, NEW MEXICO.

VARIABLE POWER-TRANSMISSION MEANS FOR COMBINATION AIR WITHDRAWING AND DELIVERY APPARATUS.

Application filed April 12, 1924. Serial No. 706,049.

*To all whom it may concern:*

Be it known that I, JAN MIKE, a citizen of the United States, residing at Dawson, in the county of Colfax and State of New Mexico have invented certain new and useful Improvements in Variable Power-Transmission Means for Combination Air Withdrawing and Delivery Apparatus, of which the following is a specification.

This invention relates to a variable transmission means for combination air withdrawal and delivery apparatus the invention being designed more particularly for embodiment in apparatus which is adapted to withdraw impure air, noxious gases, or the like, from any desired place and deliver fresh air thereto, the device being intended for use in air supply apparatus for mines, although not of necessity limited to such use.

The invention has for an object the provision of a novel apparatus of this sort, a further object relating to the provision of a novel means for effecting a relative regulation of the withdrawal and delivery devices.

For further comprehension of the invention, and of the objects and advantages thereof, reference will be had to the following description and accompanying drawing, and to the appended claims in which the various novel features of the invention are more particularly set forth.

Figure 1:
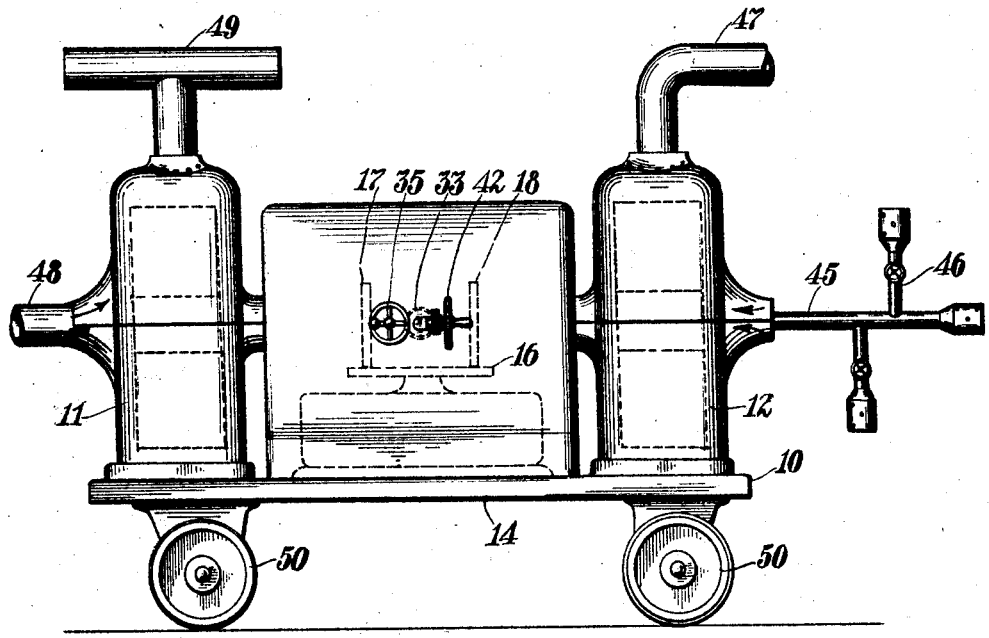

Fig. 1 of the drawing is a side view of an air supply apparatus having the invention applied thereto.

Figure 2:
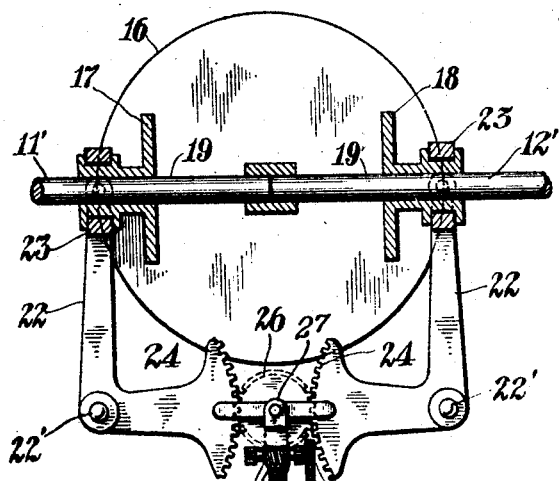

Fig. 2 is a fragmentary horizontal sectional view showing in detail the means for regulating the speed of the two fans.

As here shown my invention is embodied in a base or platform 10 on opposite ends of which are mounted the blower devices 11 and 12 respectively, each of which comprises a casing having therein a rotary fan of suitable formation, these devices being here shown as of the type arranged to draw air or gas in at the center of the fan and deliver it at the periphery thereof. The fans of the respective blowers are mounted on shafts 11' and 12' which are alined with one another and which are driven by an electric motor 14 which is mounted, with its axis vertical, on the platform 10.

The drive connection between the motor 14 and the shafts 11' and 12' is as follows: Upon the shaft of the motor is fixed a friction drive disk 16 which is engaged, on opposite sides of its centre, by a pair of driven disks 17 and 18 feathered as at 19 on the respective shafts 11' and 12'. These disks are adapted to be shifted along the said shafts by means of a pair of bell crank levers 22 connected at one end to rings 23 suitably engaged with the hub elements of the said disks, these bell crank levers being fulcrumed as at 22' to suitable fixed elements and having gear segments 24 on their other ends, these gear segments being adjacent one another and having their teeth set at a slight helical inclination.

Located between these segments and engaged with each one thereof, is a gear 26 having correspondingly inclined teeth. This gear 26 is mounted on a forked head 27, the inner end of a slidable rod 28 which extends through, and is supported by a sleeve 29 supported by a bearing element 30 in the wall of a housing 31 which covers the motor and the control mechanism, the bearing allowing free rotation of the sleeve but preventing longitudinal movement thereof. The sleeve 29 is interiorly screwthreaded and the rod 28 is formed with screw threads engaging with the threads of the sleeve. The outer end of the sleeve 29 projects beyond the housing 31 and is formed with gear teeth 33 engaged by a gear 34 mounted on the housing 31 and having fixed co-axially thereto a handwheel 35 for rotation. By turning the handwheel 35 the rod 28 is caused to move longitudinally, thereby causing the disks 17 and 18 to move oppositely in unison and varying in unison the speed of rotation of the shafts 11' and 12'.

Mounted in the head 27 of the rod 28 is a worm pinion 36 which meshes with the gear 26 and which has fixed to one end thereof a sprocket wheel 37 over which is looped a sprocket chain 38 which extends through an opening 39 in the housing 31 and is looped over a second sprocket wheel 40 mounted on a lateral offset 41 from the outer end of the rod 28, this sprocket wheel having fixed thereto a handwheel 42 for rotation purposes. By rotating this handwheel, the levers 22 are caused to be swung in a manner to move the disks 17 and 18 to increase the speed of one of the shafts 11', 12' and decrease the speed of the other. By this means an even balance between the air or gas exhausted, and the fresh air supplied may be maintained. To hold the rod against rotary movement the head 27 may be provided with wings 27' extending over the gear segments 24 in close adjacence thereto.

The bad air or gas may be drawn into the blower through suction pipe 45 which may be provided with a number of branches 46 and may be delivered through a pipe 47. The fresh air may be drawn in through a pipe 48 and delivered through a pipe 49. The platform 10 may be mounted on wheels 50 for ready transportation.

While I have illustrated and described a preferred embodiment of my invention it will be understood that I do not limit myself to the precise construction herein shown, and that various changes and modifications might be made therein without departing from the spirit and scope of the invention as defined in the appended claims.

Having thus described my invention, what I claim as new and desire to protect by Letters Patent of the United States is as follows:

1. In a device of the class described, a pair of driven shafts, a friction drive disk, a pair of driven disks mounted on the respective shafts and engaging said drive disk on opposite sides of the centre thereof, bell crank levers connected to said driven disks to adjust them along the said shafts, gear elements on the other ends of said levers, a common gear meshing with said gear elements, and means for shifting said gear bodily to impart a common movement in one direction to said levers and for rotating said gear to impart unitary movement to said levers in relatively different directions, including a longitudinally movable rod on which said gear is mounted.

2. In a device of the class described, a pair of driven shafts, a friction drive disk, a pair of driven disks mounted on the respective shafts and engaging said drive disk on opposite sides of the centre thereof, bell crank levers connected to said driven disks to adjust them along the said shafts, gear elements on the other ends of said levers, a common gear meshing with said gear elements, and means for shifting said gear bodily to impart a common movement in one direction to said levers and for rotating said gear to impart unitary movement to said levers in relatively different directions, including a longitudinally movable rod on which said gear is mounted, said gear and gear elements having helically inclined teeth, and a worm pinion mounted on said rod and meshing with said gear.

In testimony whereof I have affixed my signature.

JAN MIKE.